(12) United States Patent
Broekaert (10) Patent No.: US 7,095,876 B2
(45) Date of Patent: Aug. 22, 2006

(54) PROCESS FOR THE STABILIZATION OF THE IMAGES OF A SCENE CORRECTING OFFSETS IN GREY LEVELS, DETECTION OF MOBILE OBJECTS AND HARMONIZATION OF TWO SNAPSHOT CAPTURING APPARATUSES BASED ON THE STABILIZATION OF THE IMAGES

(75) Inventor: Michel Broekaert, L'Etang la Ville (FR)

(73) Assignee: Sagem SA, Paris (FR)

( * ) Notice: Subject to any disclaimer, the term of this patent is extended or adjusted under 35 U.S.C. 154(b) by 561 days.

(21) Appl. No.: 10/208,883

(22) Filed: Jul. 31, 2002

(65) Prior Publication Data

US 2003/0031382 A1 Feb. 13, 2003

(30) Foreign Application Priority Data

Jul. 31, 2001 (FR) .................................. 01 10243
Feb. 19, 2002 (FR) .................................. 02 02081

(51) Int. Cl.
*G06K 9/00* (2006.01)

(52) U.S. Cl. ...................................... 382/107; 348/155

(58) Field of Classification Search ............... 382/103, 382/107, 209, 264, 286, 291, 100, 269; 348/97, 348/135, 169, 154, 155, 208.1, 208.2, 208.4, 348/208.13, 699, 352, 451, 452, 700; 356/23, 356/29, 43, 149; 73/488

See application file for complete search history.

(56) References Cited

U.S. PATENT DOCUMENTS

| | | | | |
|---|---|---|---|---|
| 5,109,435 A | * | 4/1992 | Lo et al. ..................... | 382/103 |
| 5,502,482 A | | 3/1996 | Graham | |
| 5,627,905 A | * | 5/1997 | Sebok et al. ................ | 382/107 |
| 6,072,889 A | * | 6/2000 | Deaett et al. ............... | 382/103 |
| 6,480,615 B1 | * | 11/2002 | Sun et al. ................... | 382/103 |
| 6,529,613 B1 | * | 3/2003 | Astle .......................... | 382/103 |
| 6,678,395 B1 | * | 1/2004 | Yonover et al. ............ | 382/103 |
| 6,694,044 B1 | * | 2/2004 | Pavlovic et al. ............ | 382/107 |

FOREIGN PATENT DOCUMENTS

EP 986 252 A1 6/1994

OTHER PUBLICATIONS

Y.S. Yao, P. Burlina, R. Chellappa and T.H. Wu Electronic Image Stabilization Using Multiple Visual Cues Center for Automation Research, University of Maryland, College Park, MD 20742 pp. 191-194 (4 pages).
Krishnendu Chaudhury and Rajive Mehrotra A Trajectory-Based Computational Model For Optimal Flow Estimation Transactions on Robotics and Automation, Oct. 1995 pp. 733-741 (9 pages).

* cited by examiner

*Primary Examiner*—Jingge Wu
*Assistant Examiner*—Abolfazi Tabatabai
(74) *Attorney, Agent, or Firm*—Greenberg Traurig LLP (57) ABSTRACT

A process for the electronic stabilization of the images of a scene of a snapshot capturing apparatus of an imaging system in which, in a terrestrial reference frame, the images of the scene captured by the apparatus are filtered in a low-pass filter, so as to retain only the low spatial frequencies thereof, and the optical flow equation is solved to determine the rotations to be imposed on the images in order to stabilize them with regard to the previous images is provided. The invention also relates to a process for correcting offsets in grey levels of a snapshot capturing apparatus of an imaging system whose images are stabilized according to the process of the invention, where the calculation of the offsets is deduced from the steps of the stabilization process.

8 Claims, 3 Drawing Sheets

PROCESS FOR THE STABILIZATION OF THE IMAGES OF A SCENE CORRECTING OFFSETS IN GREY LEVELS, DETECTION OF MOBILE OBJECTS AND HARMONIZATION OF TWO SNAPSHOT CAPTURING APPARATUSES BASED ON THE STABILIZATION OF THE IMAGES

BACKGROUND OF THE INVENTION

The invention relates to the electronic stabilization of the images captured by an observation apparatus of an imaging system, such as portable thermal observation binoculars or observation or guidance cameras.

The carrier of the apparatus, whether it be a person or a weapon, may be in motion, on the one hand, and create all kinds of vibrations, on the other hand, and, from a certain magnification onwards, one no longer sees anything on the images which are too blurred. They must then be stabilized in order to circumvent the effects related to the trajectory of the carrier and also those caused by the vibrations to which the apparatus is subjected, in short, to compensate for the 3D motions of the apparatus.

Within the context of the present patent application, stabilization will be regarded as involving the mutual registration of the successive images supplied by the observation apparatus. More precisely, image k+1 differing from image k owing to rotations in roll, pitch and yaw, change of focal length (in the case of a camera whose zoom factor may be varied), translations and angular and linear vibrations, it is necessary to impose opposite zoom factors and rotations in order to stabilize image k+1 with respect to image k.

To do this, it is already known how to determine these rotations but via gyroscopic means based on an inertial reference frame. These are excessively powerful means. The applicant has sought a much less unwieldy and cheap solution and thus proposes his invention.

SUMMARY OF THE INVENTION

The invention relates to a process for the electronic stabilization of the images of a scene of a snapshot capturing apparatus of an imaging system in which, in a terrestrial reference frame, the images of the scene captured by the apparatus are filtered in a low-pass filter, so as to retain only the low spatial frequencies thereof, and the optical flow equation is solved to determine the rotations to be imposed on the images in order to stabilize them with regard to the previous images.

It will be stressed firstly that the reference frame of the process of the invention is no longer an inertial reference frame but a terrestrial reference frame.

The low-pass filtering is based on the following assumption. Few objects are moving with respect to the scene and it is therefore possible to make do with a process for motion compensation by predicting the motion of the apparatus, establishing a linear model describing the parameters with the motion of the apparatus (zoom, yaw, pitch, roll and focal length) and estimating these parameters with the aid of the optical flow equation, for the low, or even very low, frequencies of the images which correspond to the scene. At the low frequencies, only the big objects of the scene are retained, the small objects and the transitions of the contours being erased.

The optical flow equation measures the totality of the displacements of the apparatus.

It may be supposed that the carrier and the snapshot capturing apparatus have the same trajectory but that the apparatus additionally undergoes angular and linear vibrations which may be considered to be zero-mean noise, white or otherwise depending on the spectrum of the relevant carrier.

After having determined the displacements due to the trajectory of the apparatus, as the totality of the displacements is supplied by the optical flow equation, angular and linear vibrations are derived therefrom by differencing for the purposes of stabilization.

Preferably, the linear vibrations will be neglected on account of the observation distance and of their small amplitude with respect to the displacements of the carrier.

Again preferably, the optical flow equation is solved by the method of least squares.

Advantageously, the displacements due to the trajectory of the apparatus, or more precisely the trajectory of the centre of gravity of the carrier, are determined by estimation, for example by averaging, or filtering in a Kalman filter, the state vector of the snapshot capturing apparatus.

The invention also relates to a process for correcting offsets in grey levels of a snapshot capturing apparatus of an imaging system whose images are stabilized according to the process of the invention, characterized in that the calculation of the offsets is deduced from the steps of the stabilization process.

BRIEF DESCRIPTION OF THE DRAWINGS

The invention will be better understood with the aid of the following description of the main steps of the stabilization process, with reference to the appended drawing, in which.

DETAILED DESCRIPTION OF THE INVENTION

Let us consider an observation and guidance camera. This may be a video camera or an infrared camera.

If the scene is stationary, the points of the scene which are viewed by the camera between two images are linked by the trajectory of the carrier.

The Cartesian coordinates of the scene in the frame of the carrier are $P=(x, y, z)'$, the origin is the centre of gravity of the carrier, with the z axis oriented along the principal roll axis, the x axis corresponds to the yaw axis and the y axis to the pitch axis.

The camera is in a three-dimensional Cartesian or polar coordinate system with the origin placed at the front lens of the camera and the z axis directed along the direction of aim.

The position of the camera with respect to the centre of gravity of the carrier is defined by three rotations (ab, vc, gc) and three translations (Txc, Tyc, Tzc). The relationship between the 3D coordinates of the camera and those of the carrier is:

$$(x', y', z')' = R(ac, bc, gc) * (x, y, z)' + T(Txc, Tyc, Tzc)$$

where
R is a 3×3 rotation matrix,
T is a 1×3 translation matrix.

The trajectory of the centre of gravity is characteristic of the evolution of the state of the system and may be described by the system of differential equations $$\dot{x}(t) = F(t) \cdot x(t) + u(t) + v(t)$$

x=state vector of dimension n
F(t)=matrix dependent on t, of dimension n
u=known input vector dependent on t
v=n-dimensional Gaussian white noise The state of the system is itself observed with the aid of the camera and the solving of the optical flow equation, by m measurements z(t) related to the state x by the observation equation:

$$z(t) = H(t) \cdot x(t) + w(t)$$

where H(t) is an m×n matrix dependent on t and w is Gaussian white noise of dimension m, which may be considered to be the angular and linear vibrations of the camera with respect to the centre of gravity of the carrier.

The discrete model may be written:

$$x_{k+1} = F_k * x_k + u_k + v_k$$
$$z_k = H_k * x_k + w_k$$

$\bar{x}_k = [aP_k, aV_k, bP_k, bV_k, gP_k, gV_k, xP_k, xV_k, yP_k, yV_k, zP_k, zV_k]^T$ is the state vector at the instant k of the trajectory, composed of the angles and rates of yaw, pitch, roll and positions and velocities in x, y and z.

$x_{k+1}$ is the state vector at the instant k+1 with $t_{k+1} - t_k = Ti$.
$u_k$ is the known input vector dependent on k; this is the flight or trajectory model of the centre of gravity of the carrier.
$v_k$ is the n-dimensional Gaussian white noise representing the noise of accelerations in yaw, pitch, roll, positions x, y, z.

If the angles and translations to which the camera is subjected with respect to the centre of gravity are not constant in the course of the trajectory, in a viewfinder for example, it is sufficient to describe their measured or commanded values (ac(t), bc(t), gc(t), Txc(t), Tyc(t), Tzc(t)) as a function of t or of k.

As the trajectory of the centre of gravity of the carrier is defined by the vector $x_{k+1}$, the trajectory of the camera can be defined by a vector $xc_{k+1}$ $$xc_{k+1} = R(ac, bc, gc) * (F_k * x_k + u_k + v_k) + Tc$$

Between the observation instants k and k+1, the camera undergoes pure 3D rotations and three translations, whose values are supplied by the vector $x'_{k+1}$.

Let us consider the situation in which the elements of the scene are projected into the image plane of the camera and only these projections are known.

Figure 1:
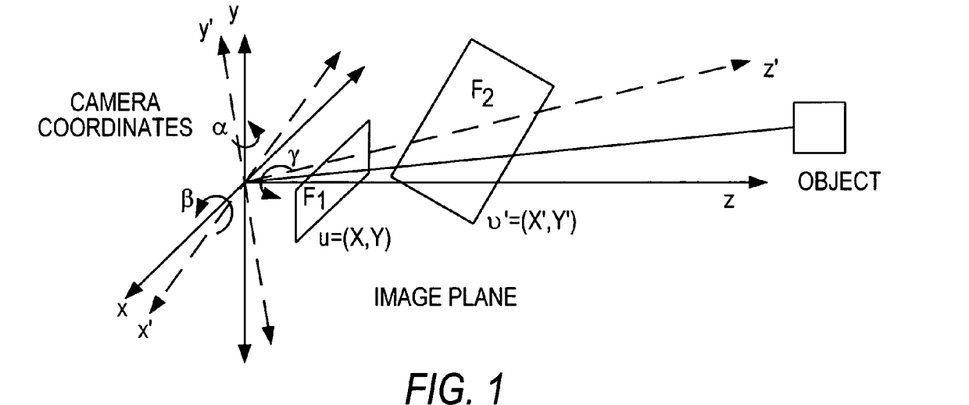
FIG. 1 illustrates the geometry of the motion of a snapshot capturing camera.

FIG. 1 shows the geometry of the motion of the camera in the 3D space of the real world.

The camera is in a three-dimensional Cartesian or polar coordinate system with the origin placed at the front lens of the camera and the z axis directed along the direction of aim.

Two cases of different complexities exist:
The scene is stationary while the camera zooms and rotates in 3D space.
The scene is stationary while the camera zooms, rotates and translates in 3D space.

Let P=(x, y, z)'=(d, a b)' be the camera Cartesian or polar coordinates of a stationary point at the time t $$x = d.\sin(a).\cos(b)$$
$$y = d.\sin(b).\cos(a)$$
$$z = d.\cos(a).\cos(b)$$

and P'=(x',y',z')'=(d', a', b')' be the corresponding camera coordinates at the time t'=t+Ti.

The camera coordinates (x, y, z)=(d, a, b) of a point in space and the coordinates in the image plane (X, Y) of its image are related by a perspective transformation equal to:

$$X = F1(X,Y).x/z = F1(X,Y).\tan(a)$$

$$Y = F1(X,Y).y/z = F1(X,Y)/\tan(b)$$

where F1(X,Y) is the focal length of the camera at the time t.

$$(x',y',z')' = R(da,db,dg)*(x,y,z)' + T(Tx, Ty, Tz)$$

where
$R = R_\gamma R_\beta R_\alpha$ is a 3×3 rotation matrix and alpha=da, beta=db, gamma=dg are, respectively, the angle of yaw, the angle of pitch and the angle of roll of the camera between time t and t'.
T is a 1×3 translation matrix with Tx=x'−x, Ty=y'−y and Tz=z−z', the translations of the camera between time t and t'.

The observations by the camera being made at the frame frequency (Ti=20 ms), it may be noted that these angles alter little between two frames and that it will be possible to simplify certain calculations as a consequence.

When the focal length of the camera at time t alters, we have:

$$F2(X,Y) = s.F1(X,Y)$$

where s is called the zoom parameter, the coordinates (X', Y') of the image plane may be expressed by $$X' = F2(X,Y).x'/z' = F2(X,Y).\tan(a')$$

$$Y' = F2(X,Y).y'/z' = F2(X,Y).\tan(b')$$

If the camera motions deduced from those of the carrier and the actual motions of the camera need to be more finely distinguished, it will be said that the carrier and the camera have the same trajectory, but that the camera additionally undergoes linear and angular vibrations.

$$(x', y', z')' = R(da+aw, db+bw, dg+gw)*(x, y, z)' + T(Tx+xw, Ty+yw, Tz+zw)$$

where
aw, bw, gw, xw, yw, zw are the angular vibrations.

These linear and angular vibrations may be considered to be zero-mean noise, white or otherwise depending on the spectrum of the relevant carrier.

The optical flow equation may be written:

$$image_{k=1}(X, Y) = image_k(X, Y) + \frac{\partial(image_k(X, Y))}{\partial X} \cdot dX_{k=1}(X, Y) + \frac{\partial(image_k(X, Y))}{\partial Y} \cdot dY_{k=1}(X, Y)$$

or: $image_{k+1}(A_i, A_j) = image_k(A_i, A_j) + Gradient)(A_i, A_j dA.\text{in-crementH} + GradientY(A_i, A_j).dA_j\text{incrementH}$ with GradientX and GradientY the derivatives along X and Y of image k (X, Y).

To estimate the gradients, use is made of the adjacent points only. Since we are seeking only the overall motion of the image of the landscape, we shall be interested only in the very low spatial frequencies of the image and hence filter the image accordingly. Thus, the calculated gradients are significant.

The low-pass filtering consists, conventionally, in sliding a convolution kernel from pixel to pixel of the digitized images from the camera, in which kernel the origin of the kernel is replaced by the average, of the grey levels of the pixels of the kernel. The results obtained with a rectangular kernel 7 pixels high (v) and 20 pixels wide (H) are very satisfactory in normally contrasted scenes. On the other hand, if we want the algorithm to operate also on a few isolated hotspots, it is better to use a kernel which preserves the local maxima and does not create any discontinuity in the gradients. Wavelet functions can also be used as averaging kernel.

A pyramid-shaped averaging kernel (triangle along X convolved with triangle along Y) has therefore been used. The complexity of the filter is not increased since a rectangular kernel with sliding average of [V=4; H=10] has been used twice. Wavelet functions may also be used as averaging kernel.

Only dX and dY are unknown, but if dX and dY can be decomposed as a function of the parameters of the state vector in which we are interested and of X and Y (or Ai, Aj) in such a way that only the parameters of the state vector are now unknown, it will be possible to write the equation in a vector form B=A*Xtrans, with A and B known.

Since each point of the image may be the subject of the equation, we are faced with an overdetermined system, A*Xtrans=B, which it will be possible to solve by the method of least squares.

The optical flow equation measures the totality of the displacements of the camera. It was seen earlier that the camera motions deduced from those of the carrier and the actual motions of the camera could be more finely distinguished by saying that the carrier and the camera have the same trajectory, but that the camera additionally undergoes linear and angular vibrations.

$$(x', y', z')' = R(ca + aw, db + bw, dg + gw) * (x, y, z)' + T(Tx + xw, Ty + yw, Tz + zw)$$

where
aw, bw, gw, xw, yw, zw are the angular and linear vibrations

Now, the displacements due to the trajectory of the camera (da, db, dg, Tx, Ty, Tz) are contained in the state vector $x'_{k+1}$ of the camera, or rather in the estimation which can be made thereof, by averaging, or by having a Kalman filter which supplies the best estimate thereof.

Since the optical flow equation measures the totality of the displacements, it will be possible to deduce the angular and linear vibrations aw, bw, gw, xw, zw therefrom, for stabilization purposes.

It should be noted that except for extremely particular configurations, it will never be possible to see the linear vibrations on account of the observation distance, or of their small amplitudes with respect to the displacements of the carrier. We will therefore observe: da+aw, db+bw, dg+gw, Tx, Ty, Tz.

Let us return to the optical flow equation:

$$image_{k=1}(X, Y) = image_k(X, Y) + \frac{\partial(image_k(X, Y))}{\partial X} \cdot dX_{k=1}(X, Y) + \frac{\partial(image_k(X, Y))}{\partial Y} \cdot dY_{k=1}(X, Y)$$

or:

$$image_{k=1}(X + dX_{k=1}(X, Y), Y + dY_{k=1}(X, Y)) = image_k(X, Y)$$

If this operation is carried out, it is seen that the images of the sequence will be stabilized in an absolute manner. Contrary to an inertial stabilization in which the line of aim is corrupted by bias, by drift and by scale factor errors, it is possible to create a representation of the scene not corrupted by bias and by drift if it is stabilized along three axes and if the distortional defects of the optic have been compensated. The fourth axis (zoom) is not entirely necessary but it may prove to be indispensable in the case of optical zoom and also in the case where the focal length is not known accurately enough or when the focal length varies with temperature (IR optics, germanium, etc.) or pressure (air index).

This may be relevant to applications where one wishes to accumulate frames free of trail, or if one wishes to keep an absolute reference of the landscape (the dynamic harmonization of a homing head and of a viewfinder for example).

However, this may also relate to applications where one will seek to restore the landscape information in an optimal manner by obtaining an image ridded of the effects of sampling and of detector size.

An improvement in the spatial resolution and a reduction in the temporal noise or in the fixed spatial noise can be obtained simultaneously.

It may be pointed out that the same equation may also be written:

$$image_{k+1}(X, Y) = image(X - dX_{k+1}(X, Y), Y - dY_{k+1}(X, Y))$$

The values $dX_{k+1}(X,Y)$, $dY_{k+1}(X,Y)$ are quite obviously not known at the instant k. On the other hand, by using the equations for the camera motion they can be estimated at the instant k+1.

This affords better robustness in the measurement of the velocities and this allows large dynamic swings of motion.

Since the same point P of the landscape, with coordinates $X_k$, $Y_k$ in image k, will be found at the coordinates $X_{k+1}$ $Y_{k+1}$ in image k+1 on account of the three rotations $aV_{k+1}.Ti$, $bV_{k+1}.Ti$, $gV_{k+1}.Ti$, and of the change of focal length, it is therefore necessary to impose opposite zoom factors and rotations so as to stabilize in an absolute manner image k+1 with respect to image k.

Let us now examine the particular case of a stationary scene and no camera translation.

When the camera undergoes pure 3D rotations, the relationship between the camera 3D Cartesian coordinates before and after the camera motion is:

$$(x', y', z')' = R*(x,y,z)'$$

where R is a 3×3 rotation matrix and alpha=da, beta=db, gamma=dg are, respectively, the angle of yaw, the angle of pitch and the angle of roll of the camera between time t and t'.

In camera 3D polar coordinates, the relationship before and after the camera motion is:

$$(d', a', b')' = K(da, db, dg)*(d, a, b)'$$

The scene being stationary, we have:
d'=d for all the points of the landscape $$X = F1(S, Y).x/z = F1(X, Y).\tan(a)$$

$$T = F1(X, Y).y/z) F1(X, Y).\tan(b)$$

When the focal length of the camera at time t alters, we have:

$$F2(X,Y) = s.F1(X,Y)$$

where s is called the zoom parameter, the coordinates (X', Y') of the image plane can be expressed by $$X' = F2(X, Y).x'/z' = F2(X, Y).\tan(a')$$

$$Y' = F2(X,Y).y'/z' F2(X, Y).\tan(b')$$

We therefore have four parameters which can vary.

Let us consider the practical case, for solving the optical flux equation, of the estimation of the rates of yaw, pitch and roll and of the change of focal length.

If we put:
B(:,:,1)=imagek+1(Ai,Aj)−imagek(Ai, Aj)
A(:,:,1)=DerivativeY(Ai,Aj).(1+(Aj.incrementV/F1(X, Y))^2)
A(:,:,2)=DerivativeX(Ai,Aj).(1+(Ai.incrementH/F1(X, Y))^2)
A(:,:,3)=DerivativeY(Ai,Aj).Ai.incrementH/incrementV−DerivativeX (Ai,Aj)..Aj.incrementV/incrementH
A(:,:,4)=DerivativeX(Ai,Aj).Ai+DerivativeY(Ai,Aj).Aj
Xtrans(1)=F1(0.0).bVk+1.Ti/incrementV
Xtrans(2)=F1(0.0)..aVk+1.Ti/incrementH
Xtrans(3)=gVk+1.Ti
Xtrans(4)=(s−1).Ti we will seek to solve the equation:

$$A*Xtrans - B = 0$$

We use the method of least squares to minimize the norm.

The equation can be written for all the points of the image. However, to improve the accuracy and limit the calculations, it may be pointed out that in the equation A*Xtrans=B, the term B is the difference of two successive images and that it is possible to eliminate all the overly small or close values of the noise.

In the trials carried out, all the points lying between +/−0.6 Max (B) and +/−Max(B) were retained. For the sequences studied, the number of points altered from a few tens to around 1500.

Figure 2:
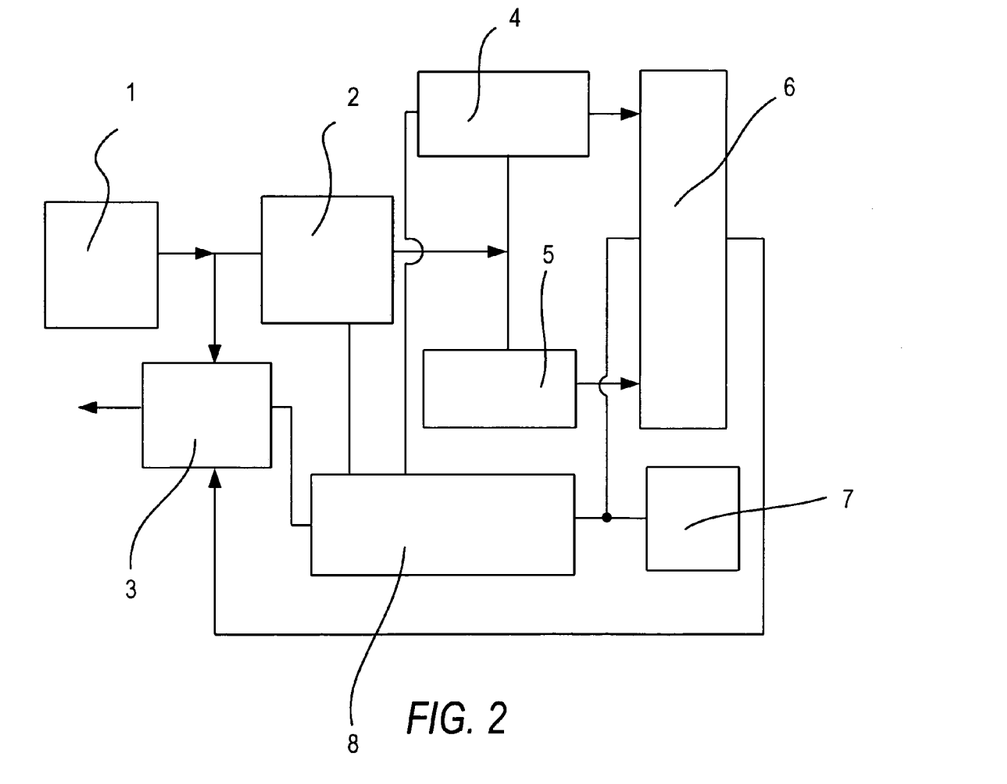
FIG. 2 is a functional diagram of the imaging system allowing the implementation of the process for the electronic stabilization of images of the invention.

With reference to FIG. 2, the imaging system allowing the implementation of the stabilization process will now be described briefly.

The snapshot capturing camera 1 delivers its video signal of images to a low-pass filter 2 as well as to a processing block 3 receiving the stabilization data on a second input and supplying the stabilized images as output. On its second input, the block 3 therefore receives the rates of rotation to be imposed on the images captured by the camera 1. The output of the filter 2 is linked to two buffer memories 4, 5 respectively storing the two filtered images of the present instant t and of the past instant t−1. The two buffer memories 4, 5 are linked to two inputs of a calculation component 6, which is either an ASIC or an FPGA (field programmable gate array). The calculation component 6 is linked to a work memory 7 and, at output, to the processing block 3. All the electronic components of the system are controlled by a management microcontroller 8.

The invention is of interest since it makes it possible to correct the offsets of the grey levels, that is to say the shifts existing between the grey levels of the various pixels of the matrix of the detectors of the camera and that of a reference pixel, without having to place the camera in front of a uniform background, such as a black body.

In reality, to undertake these offset corrections, one therefore generally starts from a reference pixel and one displaces the matrix of detectors of the camera from pixel to pixel, for each column of the matrix, then for each row, past one and the same point (element) of the scene, this amounting to performing a microscan of the scene by the camera.

Indeed, the image stabilization provides a means which is equivalent to the offset correction microscan.

Before stabilization, when the camera fixes a scene, the multiplicity of images appearing on the screen, with shifted positions, amounts to it being the scene which is displaced with respect to the camera. A defective detector in the detection matrix of the camera will not move on the screen.

After stabilization, the reverse holds, as if it were the detection matrix which was moving with respect to the stationary scene: a single defective pixel causes a streak on the screen on which the single image does not move.

The image stabilization proposed in the present patent application therefore simulates the microscan required for grey levels offset correction and the optical flow equation allows the calculation of the offsets which is therefore deduced from the steps of the stabilization process.

Here is how it is proposed to proceed, it being understood that, for practical reasons, it is desirable to calculate these offsets in a relatively short time, of a few seconds, on the one hand, and that it is necessary to use a calculation process with small convergence time, on the other hand, if one wishes to be able to maintain offset despite the rapid variations of these offsets as caused by temperature variations of the focal plane.

Two algorithms will be presented.

1) Temporal Filtering Algorithm

This is an algorithm for calculating image difference.

Let $I-_{stab_{n-1}}$ be image $I_{n-1}$ stabilized on image $I_n$.

In the case of a defective pixel of the matrix of detectors, the defect $\Delta a$ of the image $I_{stab_{n-1}}$ is the same as that of the image In, but shifted in space, since the scene is registered with respect to the scene viewed by $I_n$.

The difference $I_n - I-_{stab_{n-1}} = \Delta a_n - \Delta a-_{stab_{n-1}}$

Likewise, $I_{n+1} - I_{stab_n} = \Delta a_{n+1} - \Delta a-_{stab_n}$

The offset value remaining substantially constant ($\Delta a$), we therefore obtain $$I_{n+1} - I_{-stab_n} = -\Delta a_{-stab_n} + \Delta a$$

$$I_n - I_{-stab_{n-1}} = \Delta a - \Delta a_{-stab_{n-1}}$$

If a temporal averaging filtering is performed on the arrays of offsets obtained by differencing at each frame, $$\frac{(I_n - I_{-stab_{n-1}}) + (I_{n+1} - I_{-stab_n})}{2}$$

$$= -\frac{\Delta a_{-stab_n}}{2} + \Delta a - \frac{\Delta a_{-stab_{n-1}}}{2}$$

with a sufficiently large time constant, there is convergence to $\Delta a$ if the motions are considered to have zero mean.

Given the nature of the motions, their amplitude never exceeds a few pixels. The calculation of offset by temporal averaging filtering, which offset is in fact a differential of offset between pixels separated by the amplitude of the motion, does not in fact allow other than a local correction to be made. It will therefore be possible to correct only the high-frequency spatial variations and not the low-frequency variations, such as the optics-related effects ($\cos^4\theta$ signal) and the Narcissus effect in the case of cooled detectors.

This is why a second algorithm is proposed

2) Offset Corrections Propagation Algorithm

Rather than calculating a simple image difference in order to yield the offset, the principle of this second algorithm is, on the basis of two frames, to propagate the offset of the pixels along what may be called chains.

The principle of the first algorithm was to take the difference between frame $I_n$ and frame $I_{n-1}$ stabilized with respect to frame $I_n$. Stated otherwise, the offset at the point $(x, y)$ was rendered equal to the offset at the point $(x-mx(x,y), y-my(x,y))$, if $(mx(x,y), my(x,y))$ is the displacement making it possible to find the pixel antecedent to $(x,y)$ through the motion. This is in fact the motion of the point $(x-mx(x,y), y-mx(x,y))$.

The basic principle of the second algorithm is the same, except that the offset is propagated along the whole image.

Let us assume that we calculate the offset $\text{Offset}_n(x1,y1)$ of the point $(x1,y1)$ with respect to the point $(x0,y0)=(x1-mx(x1,y0), y1-my(x1,y1))$ which has viewed the same point of the scene, by calculating the difference:

$$\text{Offsets}_n(x1,y1) = I_n(x1,y1) - I_{n-1}(x1-mx(x1,y1), y-my(x1,y1)) \quad (47)$$

This difference is equal to:

$$I_n(x1,y1) = I_{-sta_{n-1}}(x1,y1)$$

Let us now apply this offset to $I_{n-1}$:

$$I_{n-1}(x1,y1) = I_{n-1}(x1,y1) - \text{Offset}(x1,y1) \quad (48)$$

We have recorded offsets$_n(x1,y1)$. We have also corrected the offset of the physical pixel $(x1,y1)$ in frame $I_{n-1}$ which we are considering, taking the offset of the pixel $(x0,y0)$ as reference.

Now, let us consider the point $(x2,y2)$ of image $I_n$, such that $(x2-mx(x2,y2), y2-my(x2,y2))=(x1,y1)$. This pixel of $I_n$ has viewed the same point of the landscape as the pixel $(x1,y1)$ of image $I_{n-1}$, which we have just corrected. The procedure can therefore be repeated and the offset of the physical pixel $(x2,y2)$ can be rendered equal to that of the pixel $(x1,y1)$, which was itself previously rendered equal to that of the pixel $(x0,y0)$.

We see that we can thus propagate the offset of the pixel $(x,y)$ along the whole of a chain. This chain is constructed at the end of the propagation of pixels which all have the same offset, to within interpolation errors, as we shall see subsequently. In order to be able to create this chain of corrected pixels, the image has to be traversed in a direction which makes it possible still to calculate the difference between an uncorrected pixel $(xi,yi)$ of $I_n$ and an already corrected pixel $(x(i-1), y(i-1))$ of $I_{n-1}$. This prescribed direction of traversal of the chains will subsequently be called the "condition of propagation of the offsets".

The offset common to all the pixels of the chain is the offset of its first pixel $(x0,y0)$. However, owing to the interpolation used to be able to calculate the offset differential, we shall see that the offsets of the neighbouring chains will get mixed up.

Figure 3:
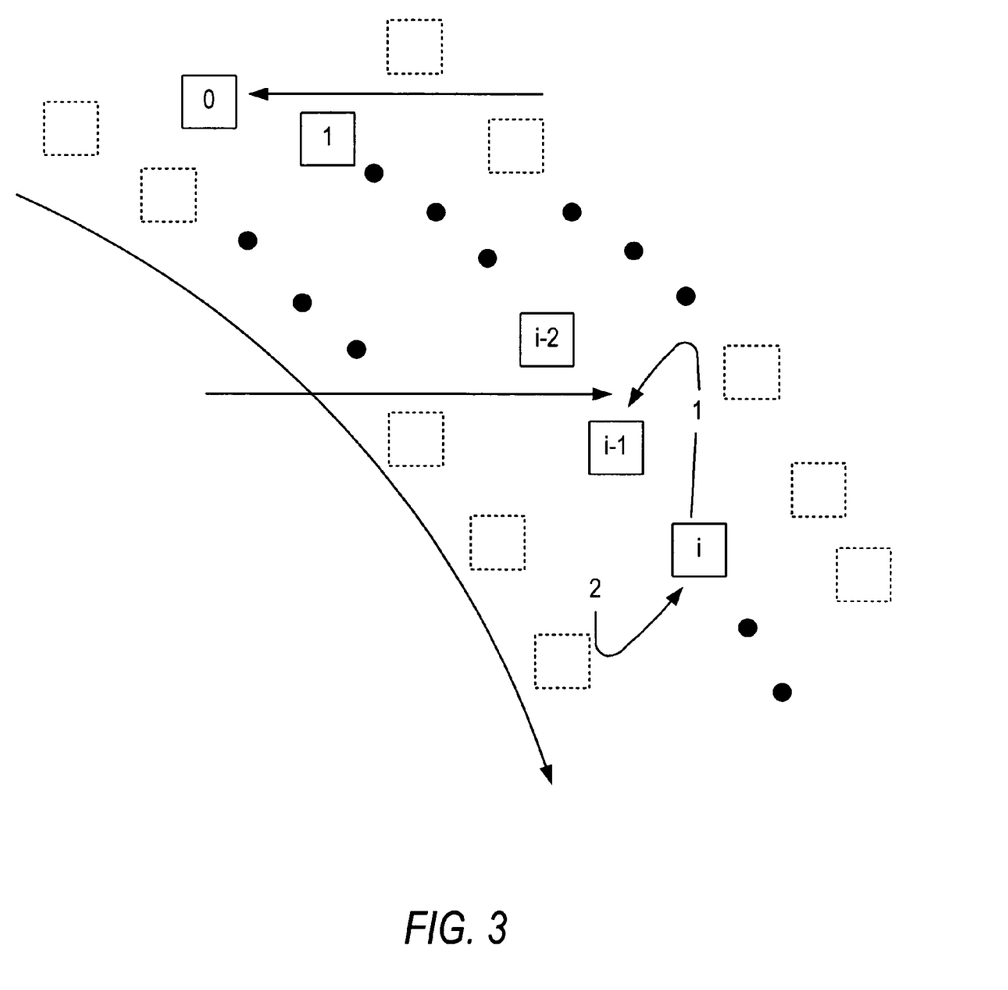
FIG. 3 is an illustration of the propagation of the offset corrections.

The principle of the propagation of the offset corrections is illustrated by FIG. 3.

Consider the chain j of pixels referenced 0, 1, ... i−2, i−1, i ... of image $I_n$.

Pixel 0 is the first pixel of the chain and has no counterpart in image $I_{n-1}$. To correct pixel i, we firstly calculate the difference between the uncorrected pixel i of image $I_n$ and pixel i−1, corrected at iteration i−1, of image $I_{n-1}$, then we undertake the correction of pixel i in image $I_{n-1}$.

However, and although the result of such a correction is very rapidly satisfactory, even right from the second image, defects still remain, trail effects, due in particular to the assumption that the first few rows and columns of pixels are assumed correct and that, between two images, there is no displacement by an integer number of pixels and that it is therefore necessary to interpolate. The longer the chains, the bigger the interpolation error.

The propagation error will be partly corrected by a temporal filtering of the offsets frames of temporal averaging type and a temporal management of the length of the chains of pixels.

By way of information, the recursive expressions of possible filters will be given hereinbelow:

filter with infinite mean $$\text{Off\_filt}_n = \frac{1}{n}\left(\sum_{k=n0}^{n} \text{Off}_n\right) = \frac{1}{n}\{(n-1)\text{Off\_filt}_{n-1} + \text{Off}_n\} \quad (49)$$

$1^{st}$-order low-pass filter $$\text{Off\_filt}_n = \frac{1}{\tau+1}\{(\tau-1)\text{Off\_filt}_{n-1} + \text{Off}_a + \text{Off}_{a-1}\}$$

The first filter is adapted more to an evaluation of the offset, the second, to a maintaining of the offset, with a time constant t of the order of magnitude of the duration after which the offset is regarded as having varied.

A filtering of the infinite type makes it possible to ally a relatively fast convergence to the offset regarded as fixed on a scale of several minutes, with good elimination of noise. However, if the measurement noise does not have zero mean, this being the case since the motion does not have an exactly zero mean, and if the nature of the scene comes into the measurement error, then the filter converges fairly rapidly at the start, but, on account of its very large phase delay will converge more and more slowly, and thereby even acquire a certain bias. In order to accelerate the convergence of the offset to zero, a certain number of feedbacks are performed, together with management of the length of the chains.

As far as the length of the chains is concerned, the counter is reinitialized to zero after a certain length L, and a new chain commences with the current pixel as reference. Thus, several changes of reference are made along the image, and the low-frequency offset is not corrected. However, since the propagation length L is reduced, the propagation errors alluded to above are reduced by the same token. All this implies that one is able to obtain an offsets correction algorithm which can be adjusted as a function of need, knowing that a gain in speed of temporal convergence translates into a loss in the correction of the low spatial frequencies.

Figure 4:
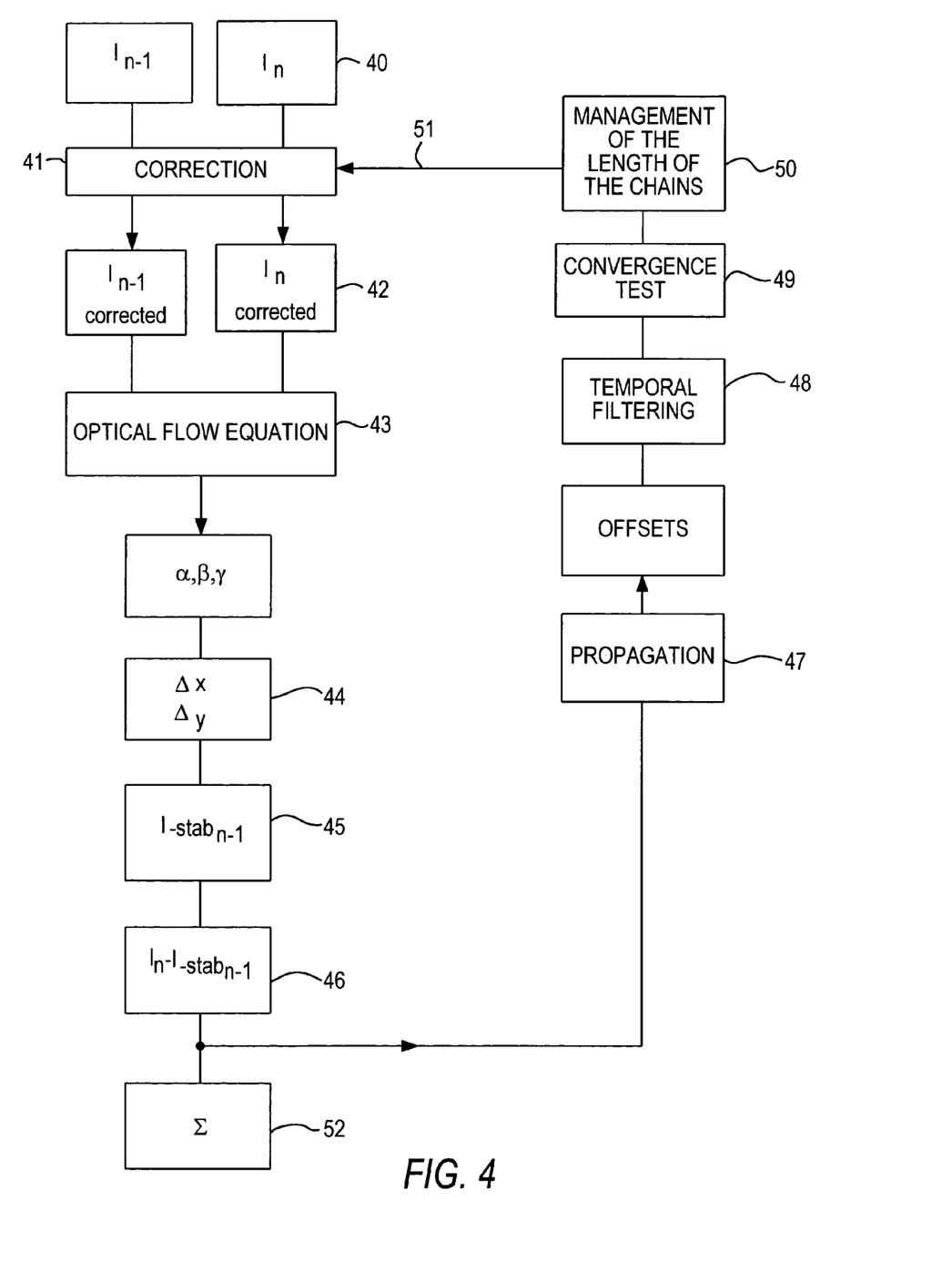
FIG. 4 is the flowchart of the stabilization process incorporating the implementation of the offsets correction algorithm.

Finally, the offsets correction algorithm is illustrated by the flowchart of FIG. 4, incorporated into the stabilization process as a whole.

Having obtained the pixels of the images $I_n$ and $I_{n-1}$ in step 40, after correction 41, the corrected images $I_{n-1}$ corrected and $I_n$ corrected are obtained in step 42. The solution, in step 43, of the optical flow equation, supplies the angles of roll $\alpha$, of pitch $\beta$ and of yaw $\gamma$ of the camera as a function also of which, in step 44, are determined the translations $\Delta x$, $\Delta y$ to be applied so as, in step 45, to stabilize the image $I_{n-1}$, with respect to image $I_n$ and, in step 46, to take the difference between the two.

After implementing the algorithm in step 47 by propagating the offset corrections, the offsets are obtained.

As far as the evaluation of the offsets is concerned, the objective is rather to obtain a correction of the offset over the entire spectrum of spatial frequencies. A filter with infinite mean is used, adopted in respect of evaluation, and, knowing that there is a bias in the measurement owing to the phase delay of the filter, we operate a feedback of the offset after convergence, a certain number of times. The feedback is carried out when the sum of the differences between two arrays of consecutive filtered offsets goes below a certain threshold.

However, this must be coupled with a decrease in the length of the chains (50), so as to eliminate the propagation errors, which are all the bigger the longer the chains.

If the length of the chains of pixels is decreased at each feedback, the influence of the offset on the low spatial frequencies will gradually be inhibited, however they will have already been corrected during the first few feedbacks.

The shorter the length L of the chains, the smaller the propagation errors will be, and consequently the faster the infinite filter will converge.

To summarize, after stabilizing the images, the offsets are determined by an algorithm (47) for calculating image differences (46), preferably, by an offset corrections propagation algorithm (47).

Advantageously, a temporal filtering of the offsets frames is carried out (48), followed by a convergence test (49) and by a management (50) of the length of the chains of pixels so as to eliminate the propagation errors.

Again preferably, feedbacks of the offsets are carried out (51).

After pairwise stabilization of the images (45), leading to a certain sharpness of the mobile objects, by virtue of the calculation by image difference (46), it is possible by summing (52) the differences (FIG. 4) to eliminate all the fixed objects from the images and thus to detect the mobile objects of the scene with the aid of the snapshot capturing apparatus of the imaging system whose images are stabilized and whose offsets are corrected according to the processes of the invention.

A process for stabilizing the images of a single snapshot capturing apparatus of an imaging system has just been described, in which these images are stabilized with respect to the previous images.

Stated otherwise, the process described is an auto-stabilization process, in which the image of the instant t is stabilized with respect to the image of the instant t−1. Again stated otherwise, each image of the imaging system may be said to be harmonized with the previous image.

Of course, the applicant has realized that it was possible to extrapolate the stabilization process described hereinabove to the harmonization of two optical devices mounted on one and the same carrier, such as for example an aiming device of a weapon fire control post and the snapshot capturing device of an imaging system of auto-guidance means of a rocket or of a missile, on board a tank or a helicopter, again for example. To this end, one proceeds in exactly the same manner.

At the same instant t, the two images of the two devices are captured and they are stabilized with respect to one another, that is to say the two devices are harmonized.

Harmonizing amounts to merging the optical axes of the two devices and to matching the pixels of the two images pairwise and, preferably, also to merging these pixels.

Naturally, the two devices to be harmonized according to this process must be of the same optical nature, that is to say operate in comparable wavelengths.

Thus, the invention also relates to a process for the electronic harmonization of two snapshot capturing apparatuses of two imaging systems both capturing images of the same scene, in which, in a terrestrial reference frame, the images of the scene captured at the same instants by the two apparatuses are filtered in a low-pass filter, so as to retain only the low spatial frequencies thereof, and the optical flow equation between these pairs of respective images of the two apparatuses is solved so as to determine the rotations and the variation of the relationship of the respective zoom parameters to be imposed on these images so as to harmonize them with one another.

What is claimed is:

1. Process for correcting offsets in grey levels of a snapshot capturing apparatus of an imaging system whose images are stabilized according to a process for the electronic stabilization of the images of a scene of a snapshot capturing apparatus of an imaging system in which, in a terrestrial reference frame, the images of the scene captured by the apparatus are filtered in a low-pass filter, so as to retain only the low spatial frequencies thereof, and the optical flow equation is solved to determine the rotations to be imposed on the images in order to stabilize them with regard to the previous images, wherein the calculation of the offsets is deduced from the steps of the stabilization process.

2. Process for correcting offsets according to claim 1, in which, after stabilization of the images, the offsets are determined via an algorithm for calculating image differences.

3. Process for correcting offsets according to claim 2, in which an offset corrections propagation algorithm is implemented.

4. Process for correcting offsets according to claim 2, in which a temporal filtering of the offsets frames is carried out 5. Process for correcting offsets according to claim 4, in which, after filtering the offsets frames, a convergence test and a management of the length of the chains of pixels are carried out.

6. Process for correcting offsets according to claim 1, in which feedbacks of the offsets are carried out.

7. Process for detecting mobile objects in a scene by capturing snapshots with the aid of an apparatus of an imaging system whose images of the scene are stabilized according to the process of claim 1, wherein after pairwise stabilization of the images and correction of offsets by image difference calculation, the differences are summed so as to eliminate the fixed objects of the scene from the images.

8. Process for the electronic harmonization of two snapshot capturing apparatuses of two imaging systems both capturing images of the same scene, in which, in a terrestrial reference frame, the images of the scene captured at the same instants by the two apparatuses are filtered in a low-pass filter, so as to retain only the low spatial frequencies thereof, and the optical flow equation between these pairs of respective images of the two apparatuses is solved so as to determine the rotations and the variation of the relationship of the respective zoom parameters to be imposed on these images so as to harmonize them with one another.

* * * * *